United States Patent
Franco et al.

(10) Patent No.: US 8,951,688 B2
(45) Date of Patent: Feb. 10, 2015

(54) METHOD AND DEVICE FOR INCREASING THE SERVICE LIFE OF A PROTON EXCHANGE MEMBRANE FUEL CELL

(75) Inventors: Alejandro Franco, Eybens (FR); Olivier Lemaire, Les Abrets (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 201 days.

(21) Appl. No.: 13/379,674

(22) PCT Filed: Jul. 9, 2010

(86) PCT No.: PCT/FR2010/051458
§ 371 (c)(1),
(2), (4) Date: Feb. 16, 2012

(87) PCT Pub. No.: WO2011/004134
PCT Pub. Date: Jan. 13, 2011

(65) Prior Publication Data
US 2012/0183874 A1    Jul. 19, 2012

(30) Foreign Application Priority Data
Jul. 9, 2009   (FR) .................................... 09 54767

(51) Int. Cl.
*H01M 8/00* (2006.01)
*H01M 8/04* (2006.01)
*H01M 8/10* (2006.01)

(52) U.S. Cl.
CPC ...... *H01M 8/04223* (2013.01); *H01M 8/04089* (2013.01); *H01M 2008/1095* (2013.01); *Y02E 60/50* (2013.01)
USPC ........................... 429/430; 429/428; 429/443

(58) Field of Classification Search
USPC ................. 429/408–427, 429–451, 512–516, 429/523–534, 535
See application file for complete search history.

(56) References Cited

U.S. PATENT DOCUMENTS

| | | | | |
|---|---|---|---|---|
| 6,030,718 | A * | 2/2000 | Fuglevand et al. | 429/410 |
| 6,068,943 | A * | 5/2000 | Divisek et al. | 429/410 |
| 2004/0126629 | A1 | 7/2004 | Reiser | |
| 2009/0155643 | A1 | 6/2009 | Guillet | |

FOREIGN PATENT DOCUMENTS

| | | |
|---|---|---|
| EP | 0 692 835 | 1/1996 |
| EP | 1 460 704 | 9/2004 |
| FR | 2 925 229 | 6/2009 |
| JP | 2006-278190 | 10/2006 |
| JP | 2007-53012 | 3/2007 |
| JP | 2009-181810 | 8/2009 |

OTHER PUBLICATIONS

Machine Translation of Ikeda et al. (JP 2009-181810, published Aug. 2009, pp. 1-14).*

(Continued)

*Primary Examiner* — Basia Ridley
*Assistant Examiner* — Caitlin Wilmot
(74) *Attorney, Agent, or Firm* — Burr & Brown, PLLC (57) ABSTRACT

A method of using a proton exchange membrane fuel cell, composed of a polymer membrane and electrodes present on either side of the membrane, includes at least one step of reversing the functioning of the cell during use.

12 Claims, 5 Drawing Sheets

(56) References Cited

OTHER PUBLICATIONS

Franco et al., "*Impact of Carbon Monoxide on PEFC Catalyst Carbon Support Degradation Under Current-Cycled Operating Conditions,*" Electrochimica Acta, vol. 54, No. 22 (2009) p. 5267-5279.

Meyers et al., "*Model of Carbon Corrosion in PEM Fuel Cells,*" Journal of the Electrochemical Society, 153 (8) A1432-A1442 (2006).

Franco et al., "*Multiscale Model of Carbon Corrosion in a PEFC: Coupling with Electrocatalysis and Impact on Performance Degradation,*" Journal of the Electrochemical Society, 155(4) B367-B384 (2008).

Shao et al., "*Understanding and Approaches for the Durability Issues of Pt-based Catalysts for PEM Fuel Cell,*" Journal of Power Sources, 171 (2007) p. 558-566.

\* cited by examiner

METHOD AND DEVICE FOR INCREASING THE SERVICE LIFE OF A PROTON EXCHANGE MEMBRANE FUEL CELL

BACKGROUND OF THE INVENTION

1. Field of the Invention

The present invention is situated in the field of proton exchange membrane fuel cells, well known under the acronym PEMFC.

It proposes a solution for limiting the phenomenon of corrosion of the carbon catalytic carrier that occurs at the cathode of such cells, and thus prolonging the service life thereof.

More precisely, the present invention is based on a reversal of the functioning of the cell.

2. Description of Related Art

Figure 1:
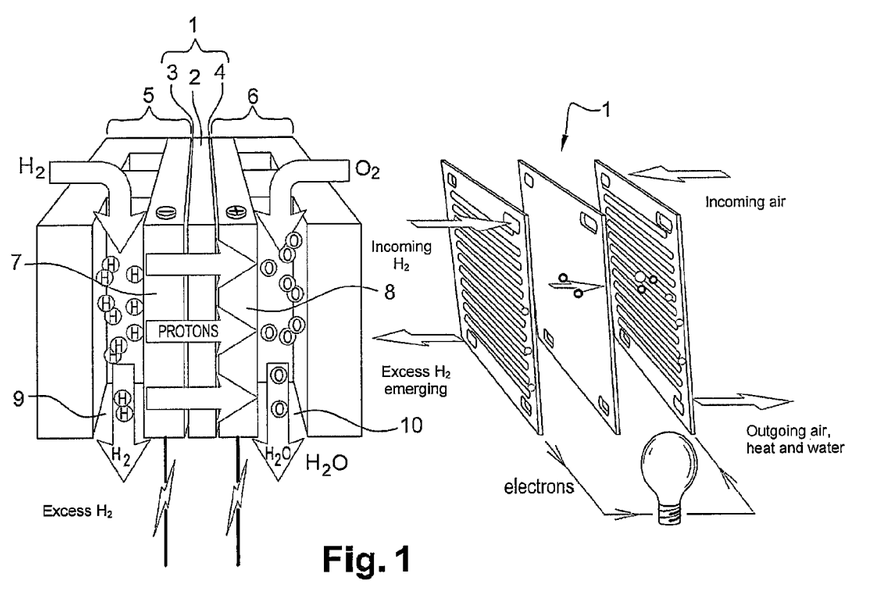
FIG. 1 shows the diagram of the principle of a fuel cell of the PEMFC type.

PEMFCs are current generators the operating principle of which, illustrated in FIG. 1, is based on the conversion of chemical energy into electrical energy, by catalytic reaction of hydrogen and oxygen.

Membrane-electrode assemblies or MESs 1, commonly referred to as cell cores, constitute the basic elements of PEMFCs. They are composed of a polymer membrane 2 and catalytic layers 3, 4 present on either side of the membrane 2 and constituting respectively the anode and cathode.

The membrane 2 therefore separates the anodic 5 and cathodic 6 compartments. The catalytic layers 3, 4 generally consist of platinum nanoparticles supported by carbon aggregates. Gaseous diffusion layers 7, 8 (carbon fabric, felt, etc.) are arranged on either side of the MES 1 in order to provide the electrical conduction, the homogeneous distribution of the reactive gases and the discharge of the water produced by the reaction. A system of channels 9, 10 placed on either side of the MES brings in the reactive gases and discharges the water and excess gases to the outside.

Figure 2:
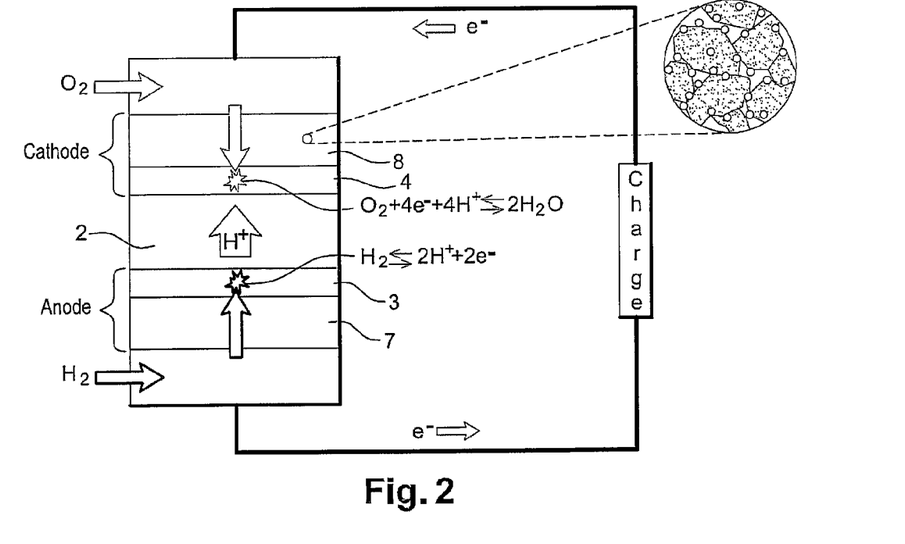
FIG. 2 shows the initial functioning of a fuel cell of the PEMFC type.

At the anode 3, the decomposition of the hydrogen adsorbed on the catalyst produces protons $H^+$ and electrons $e^{3 1}$. The protons then pass through the polymer membrane 2 before reacting with the oxygen at the cathode 4. The reaction of the protons with the oxygen at the cathode leads to the formation of water and the production of heat (FIG. 2).

Improving the service life of PEMFCs constitutes a major factor for the use and development of cells for the mass market. This is why revealing and understanding phenomena of ageing of the core of such cells are at the present time essential.

Figure 3:
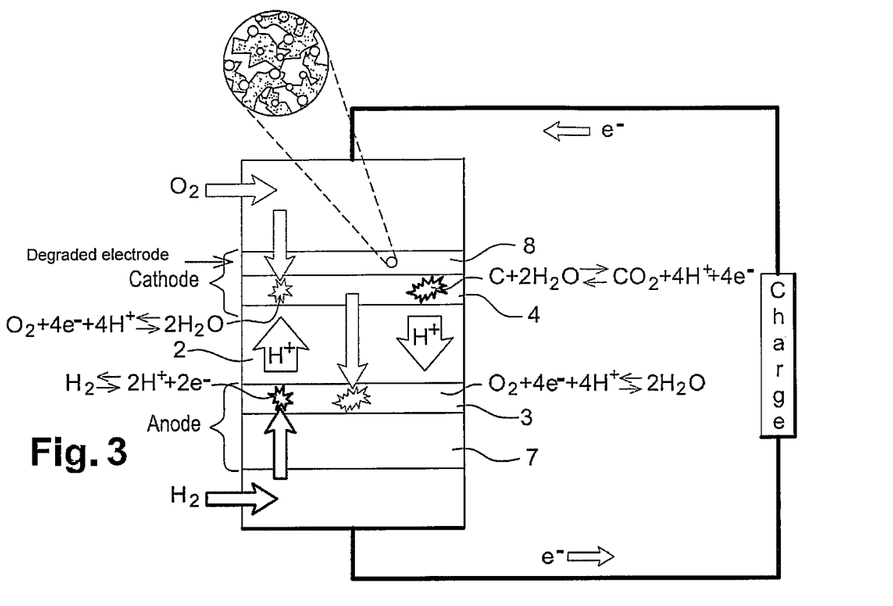
FIG. 3 shows the functioning of a fuel cell of the PEMFC type after several hundred hours.

It has been observed that the degradation of the materials of the electrodes concerns especially the cathodic active layer 4 (FIG. 3). Corrosion of the carbon catalytic carrier at the cathode, a well-known mechanism, is particularly detrimental for the cell.

The carbon carrier oxidises in accordance with the following reaction:

$$C+2H_2O \leftrightarrows CO_2+4H^++4e^- \qquad (1)$$

This degradation is accentuated when the cell is subjected to power cycles (J. P. Meyers and R. M. Darling *J. Electrochem. Soc.*, 153 (8), A1432, 2006).

The potential of this reaction (1) is approximately 0.2 V/SHE. Given that the cathodic potential of a cell is generally greater than 0.2 V, this reaction always takes place.

Moreover, the oxygen present at the anode 3 is normally reduced by the hydrogen in the anodic compartment. However, during stop/start phases, power cycles, the formation of water plugs and the stoppage of the supply of hydrogen, the hydrogen is not sufficient to reach the oxygen. During these phases, the oxygen still present has recourse to other sources of protons and, in particular, to those produced by the oxidation of the cathodic carbon. The oxygen present at the anode 3 therefore acts as a proton ("proton pump effect") that accentuates the corrosion of the carbon at the cathodic catalytic layer 4, and reaction (1) is then strongly moved to the right (FIG. 3):

$$C+2H_2O \rightleftharpoons CO_2+4H^++4e^- \qquad (2)$$

The degradation of the platinum at the cathode also participates in the reduction of the performance of the cell. One of the degradation mechanisms concerns the oxidation, dissolution and recrystallisation of the platinum.

Electrochemical maturation is another platinum degradation mechanism that leads to an increase in the size of the platinum particles.

In addition, degradation of the cathodic carbon carrier causes detachment of the platinum particles (A. A. Franco and M. Gérard *J. Electrochem. Soc.*, 155 (4), B367, 2008) (Y. Shao, G. Yin and Y. Gao *J. Power Sources*, 171, 558, 2007).

Methods for increasing the service life of fuel cells have been proposed.

Thus one technical solution for limiting the corrosion of the carbon at the cathode, described in document JP 2006-278190, consists in introducing carbon dioxide ($CO_2$) in air, at the cathode, and controlling the quantity thereof.

More recently, document FR 2 925 229 describes a solution based on a periodic reduction of the temperatures of the cell and humidifiers for a few hours, so as to maintain a stable relative humidity. This solution effectively significantly increases the service life of the cells but requires a temperature control device.

In addition, the introduction of a chemical compound in small quantities into the hydrogen (at the anode), such as CO, firstly limits the "proton pump" effect and therefore reduces the phenomenon of corrosion of the cathodic carbon, and secondly limits the degradation of the protonic conductive polymer. The service life of the cell is also significantly increased (A. A. Franco, M. Guinard, B. Barthe and O. Lemaire *Electrochimica Acta.*, 54, 5267-5279, 2009).

SUMMARY OF THE INVENTION

The present invention forms part of the search for novel technical solutions for limiting the corrosion of the carbon at the cathode at PEMFCs, and thus prolonging the service life thereof.

Essentially, the present invention proposes to reverse the functioning of the cell. Since the deterioration of the electrodes is not symmetrical, reversal firstly protects the deteriorated cathode, which then functions correctly as an anode, and secondly makes it possible to use the non-affected anode as a new cathode. It is clear that the present invention constitutes an inexpensive technical solution that is simple to implement.

Thus the present invention concerns a method of using a fuel cell of the PEMFC type consisting in performing at least one reversal of the functioning of the cell during use thereof.

More precisely, the cell being composed of a polymer membrane and electrodes, namely an anode and a cathode, it is recommended exchanging the respective roles of these electrodes. In practice and following this reversal, the electrode that fulfilled the role of anode becomes the cathode and conversely the electrode that fulfilled the roll of cathode becomes the anode.

Thus, and according to a first aspect, the invention concerns a method of using a fuel cell of the PEMFC type, composed of a polymer membrane and electrodes present on either side of the membrane, which comprises the following steps:
    measuring the initial performance of the cell;
    monitoring the performance of the cell over time;
    reversing the electrodes corresponding to the anode and cathode, respectively, during use, when a predetermined threshold of the performance is reached.

In the context of the invention, "performance" means advantageously the potential (U) of the cell.

This reversal operation can be repeated until the cell collapses, that is to say the potential collapses.

According to a first embodiment, the functioning of the cell is reversed by means of a physical reversal of the cell. It is therefore a case of physically exchanging the electrodes, that is to say an at least partial movement of the device. In practice, it is a case of dismantling the cell and turning over the cell core (the MES assembly) and then reclosing the cell.

Alternatively and according to a second embodiment, it is a case of reversing the nature of the gases supplied to each of these electrodes. Thus it is known that the anode is supplied with hydrogen (fuel) and that the cathode is supplied with air or oxygen (oxidant). By controlling the nature of the gases sent to each of these electrodes, it is therefore possible to fix their role of cathode or anode and to exchange them. Advantageously, when it is the gas supply that is exchanged, the supply system is cleaned before the reversal of the gases, advantageously by circulating a neutral gas in the system.

By virtue of this reversal, the catalytic activity that is greatly reduced at the cathode is then improved. Reversing the electrodes of the cell acts as a regeneration. The highly-degraded cathode then becomes the anode. This new configuration is entirely adapted to an optimised continuation of the function of the cell:
    the reduction in the active surface of the new anode has no consequence since a very light loading with catalysts can provide oxidation of the oxygen.
    moreover, the opening and increase in the porosities of the new anodic active layer, due to the corrosion of the carbon carrier and the increase in the size of the Pt grains makes it possible to make the oxygen present at the anode react more easily with the hydrogen and reduces the phenomenon of hydrogen depletion at the new anode. The "proton pump" effect is then limited.

Thus it has been observed in the context of the present invention that, for a fuel cell where the catalyst loading at the anode and at the cathode is identical and when the protonic conductive electrode is little affected by ageing, the service life of the cell can be at least doubled.

It is proposed to perform at least one reversal step during the use of the cell. Advantageously, the reversal is repeated, that is to say it is performed at least twice during the use of the cell.

The moment chosen for the reversal can be determined in different ways:
    when the drop in performance of the cell reaches a predetermined threshold, advantageously a reduction (or loss) of 20% of the initial performance of the cell.
    Alternatively, it is possible to await a plunge in the performance of the cell, that is to say the potential collapses (U=0). This embodiment, preferred in the context of the present invention, requires monitoring of the potential of the cell over time. Preferentially, the cell is therefore connected to a system for measuring the potential. Measurement of the potential in real time can be carried out continuously or at predetermined intervals of time, regular or not. In the case of functioning under pure gases, this measurement can be carried every ten minutes, or even every hour. On the other hand, in the case of the use of an impure gas (fuel or oxidant), it is preferable to increase the frequency of the measurements, since the presence of impurities may give rise to a rapid plunge in the performance. The measurement of the potential is then advantageously carried out at a minimum every minute.
    alternatively, at the end of a predetermined functioning time of the cell, advantageously after a few hundreds of operating hours, advantageously around 500 hours of operation.

As already stated, at least one reversal is performed. However, it may be envisaged that the reversal be repeated on several occasions and therefore repetitive, optionally randomly or by applying one or other or both of the criteria stated above (according to the potential or time). The threshold values applied may remain constant throughout the use or may vary.

In practice, the reversal of the gas supply to the electrodes can be carried out by means of the arrangement of the cell on a rotary platform. It is then necessary to disconnect the cell from its supply system, for example by means of quick couplings. The platform then drives the cell in a half turn so that the cathode is in the anode position and the anode is in the cathode position.

Alternatively, each electrode is provided with a dual gas supply system and advantageously a means of controlling the supply. Thus each can be supplied with fuel, in particular hydrogen, and oxidant, in particular oxygen and/or air, respectively. The nature of the gas supplying the electrode determines the function thereof. As already mentioned, the gas supply system is advantageously cleaned, preferably by circulation of a neutral gas, before each reversal.

The control system makes it possible to activate one or other of the gas supply systems. It advantageously consists of valves. At the time of reversal of functioning, the position of the valves is changed, which results in a reversal of the gas supply to each electrode.

Insofar as at the discharge each electrode is connected to a system for discharging the surplus gas, a dual discharge system is also provided with a control system for selecting the routing of the discharge of the gases. There also, it advantageously consists of valves that are interchanged during reversal.

Preferentially, the system for controlling the supply and discharge of gases for the electrodes, advantageously valves, is connected to a system for measuring the potential of the cell or the operating time of the cell. Under these conditions, the interchange takes place automatically.

BRIEF DESCRIPTION OF THE DRAWINGS

The way in which the invention can be implemented and the advantages that result therefrom will emerge more clearly from the following example embodiment, given by way of indication and in no way limitatively, with the help of the accompanying drawings, among which.

DETAILED DESCRIPTION OF THE INVENTION

1) Principle of the Reversal:

The initial operating diagram of a fuel cell 1 is illustrated in FIG. 2. The cathodic active layer 4 is not degraded. The carbon particles are intact and the catalyst particles are evenly distributed (FIG. 2). On a functional level, the result is good contact resistance and a large active surface.

As illustrated in FIG. 3, the damage to the carbon carrier at the cathode 4 and the increase in the size of the particles after functioning cause the loss of catalytic surface and an increase in the contact resistance between the cathode 4 and the gaseous diffusion layer 8. All these phenomena participate in the reduction in the durability of the PEMFCs.

Figure 4:
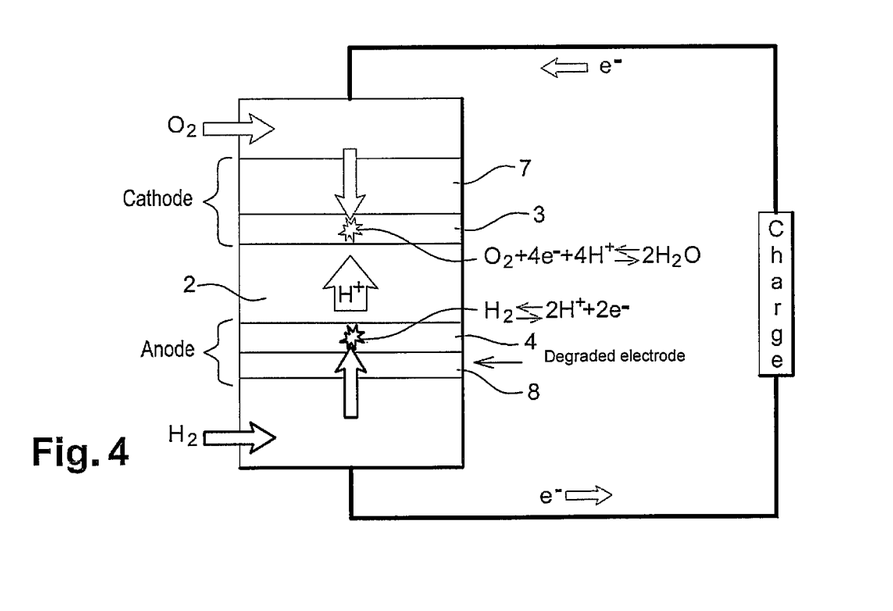
FIG. 4 shows the functioning of a fuel cell of the PEMFC type after reversal of the electrodes.

As recommended by the invention, by reversing the functioning of the cell, the electrode that functioned as the anode 3 becomes the cathode 4 and the electrode that functioned as the cathode 4 becomes the anode 3. Thus, as is clear from FIG. 4, the active layer of the highly-degraded cathode is then replaced by the active layer of the initial anode that is almost intact.

Figure 5A:
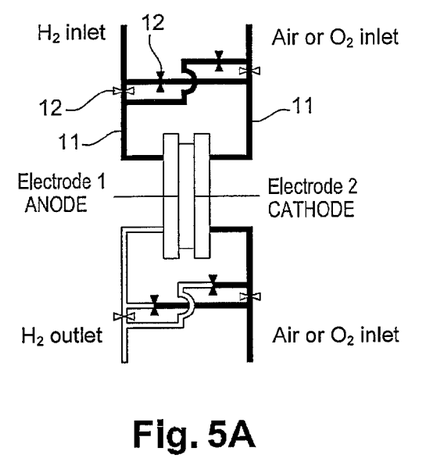
FIG. 5 shows schematically a device according to the invention provided with valves according to a first configuration (A) or a second configuration (B).
Figure 5B:
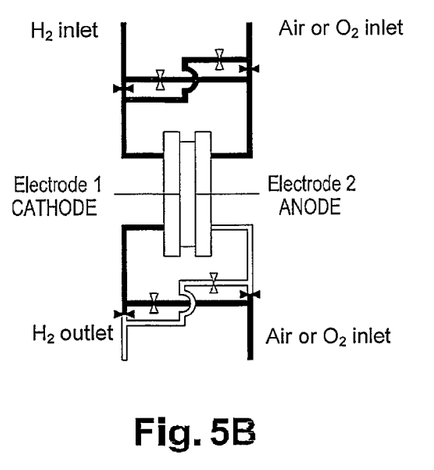

2) Implementation of the Reversal:

2-1) Device Provided With Valves:

Such a device is illustrated in FIG. 5. It can be seen that each electrode is connected to a dual gas supply system 11, both at the inlet and the outlet, equipped with valves 12.

In configuration A (FIG. 5A), the valve system 12 introduces hydrogen into the electrode 1 (then assimilatable to the anode 3) and air or oxygen into the electrode 2 (then assimilatable to the cathode 4). The valve system at the outlet from the cell sends hydrogen into the system provided for collecting the fuel gases 9 and sends air or oxygen into the system provided for collecting the oxidising gases 10.

In configuration B (FIG. 5B), the valves open in configuration A are closed and the valves closed are open. The hydrogen is then supplied to the electrode 2 (then assimilatable to the anode 3) and the air or oxygen is supplied to the electrode 1 (then assimilatable to the cathode 4). The valves at the outlet of the cell are also interchanged so that the hydrogen issuing from the electrode 2 can be connected in the system provided for the fuel gas 9. Likewise, the air or oxygen issuing from the cell is directed into the system provided for the oxidising gases 10.

Figure 6:
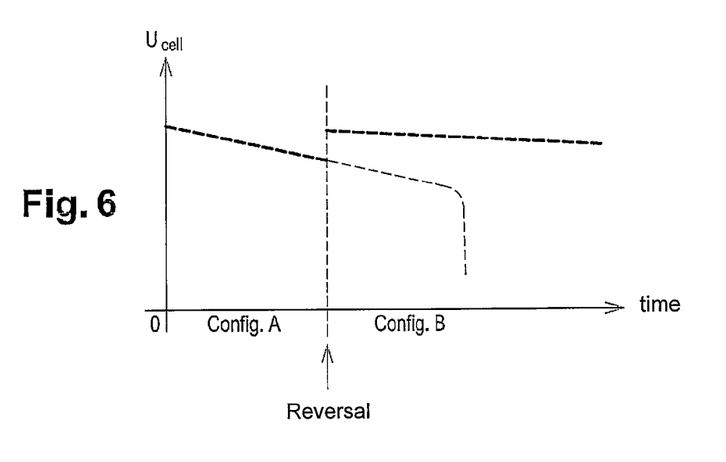
FIG. 6 illustrates the change in potential of the cell as a function of time, in the case of reversal performed when the performance of the cell goes below a predetermined threshold.
Figure 7:
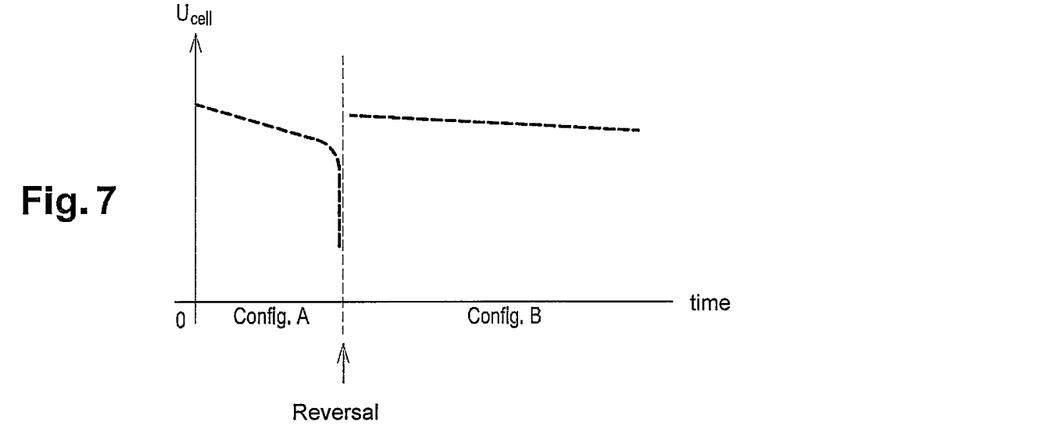
FIG. 7 illustrates the change in the potential of the cell as a function of time, in the case of a reversal performed when the performance of the cell has fallen.

2-1-1 Reversal at a Predetermined Performance Threshold:

In this example, the cell is reversed when the performance of the cell has decreased for example by 20% (FIG. 6). There is thus a change from functioning according to configuration A to functioning according to configuration B. The speed of the degradation of the cell potential is decreased.

The durability of the fuel cell is increased by at least double compared with the case where the configuration reversal is not applied.

Figure 9A:
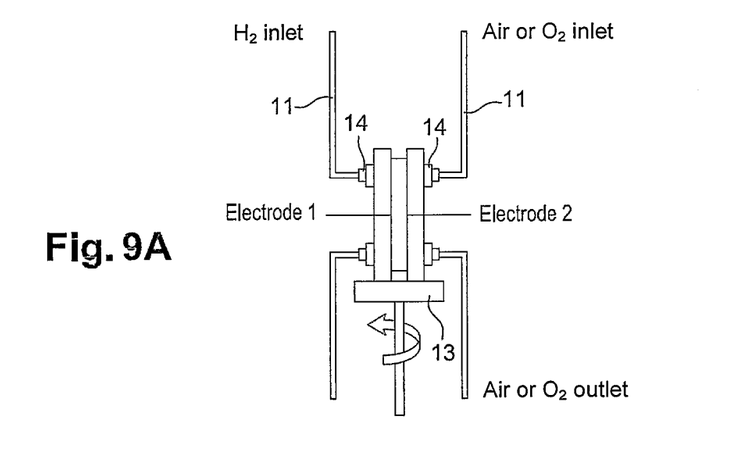
FIG. 9 shows schematically a device according to the invention provided with a rotary platform according to a first configuration (A) or a second configuration (B).
Figure 9B:
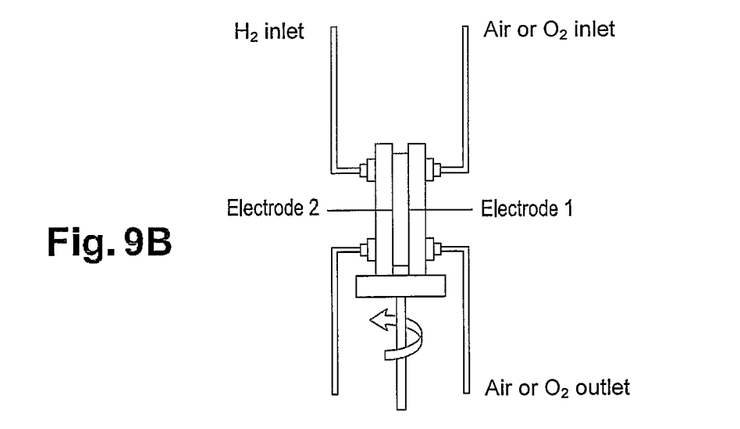

2-1-2) Reversal During Plunge in Performance:

The change from configuration A to configuration B is effected at the time of collapse of cell potential resulting from the degradation of its cathode (FIG. 9). The cell potential is increased and the speed of its degradation decreases.

Figure 8:
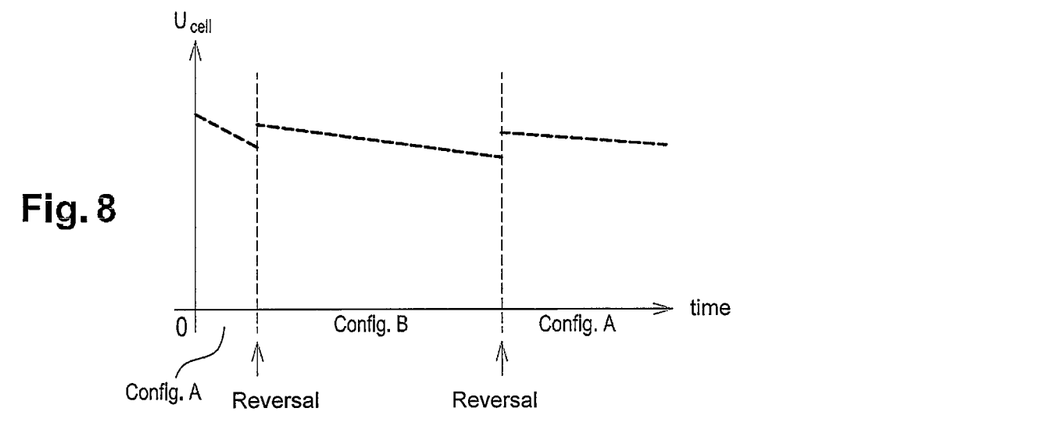
FIG. 8 illustrates the change in the potential of the cell as a function of time, in the case of a reversal repeated over time.

2-1-3) Repetitive Reversal:

The change from configuration A to configuration B is effected repetitively. The speed of the degradation of the cell potential is decreased more and more (FIG. 8). In this operating mode, the cell is reversed periodically. The reversal is related neither to a performance threshold (see 2-1-1) nor to an abrupt plunge in the potentials (see 2-1-2). The durability of the fuel cell is increased by at least double compared with the case where the series of configuration reversals is not applied.

The three operating modes described above can of course be coupled.

2-2) Device Provided with a Rotary Platform:

According to this embodiment illustrated in FIG. 9, the cell is supported on a rotary platform 13 for reversing access of the gases. In this case, the gas circuit 11 remains in place. It is the cell that moves, being secured to a platform example.

It is then necessary to disconnect the cell from its supply system 11, for example by means of quick couplings 14. The platform 13 then drives the cell in a half turn (180° so that the former cathode (electrode 2) is in the anode position and the former anode (electrode 1) is in the cathode position.

The invention claimed is:

1. A method for the use of a proton exchange membrane fuel cell, composed of a polymer membrane and electrodes present on either side of the membrane, comprising the steps of:

measuring the initial performance of the cell;

monitoring the performance of the cell over time; and reversing the electrodes corresponding to an anode and a cathode, respectively, during use, when a predetermined threshold of the performance is reached;

wherein the purity of a gas provided at the anode determines a frequency at which the performance of the cell is monitored, whereby the performance is monitored at least once a minute when the gas has impurities, and the performance is monitored at least once an hour when the gas is pure.

2. The method according to claim 1, wherein the reversal of the electrodes is repeated on at least two occasions during use.

3. The method according to claim 1, wherein the reversal of the electrodes consists in physically exchanging the electrodes.

4. The method according to claim 1, wherein the reversal of the electrodes consists in exchanging the gas supply to the electrodes.

5. The method according to claim 1, wherein the predetermined performance threshold corresponds to a drop of 20% in the initial performance of the cell.

6. The method according to claim 1, wherein the performance of the cell over time is monitored continuously or at predetermined intervals of time.

7. The method according to claim 4, wherein before the electrodes are reversed, the gas supply system is cleaned, advantageously by passing a neutral gas.

8. A fuel cell suitable for implementing the method according to claim 1, wherein the fuel cell comprises a system for supplying oxidant and fuel to each electrode.

9. The fuel cell according to claim 8, wherein the supply system is equipped with valves.

10. A fuel cell suitable for implementing the method according to claim 1, wherein the fuel cell is arranged on a rotary platform.

11. The fuel cell according to claim 10, wherein the fuel cell is connected to the gas supply system by means of quick couplings.

12. The fuel cell according to claim 8, wherein the fuel cell is connected to a system for measuring the potential of the cell.

* * * * *